J. F. APPLEBY.
BEET HARVESTER.
APPLICATION FILED APR. 20, 1906.
1,044,472.
Patented Nov. 19, 1912.
3 SHEETS—SHEET 1.
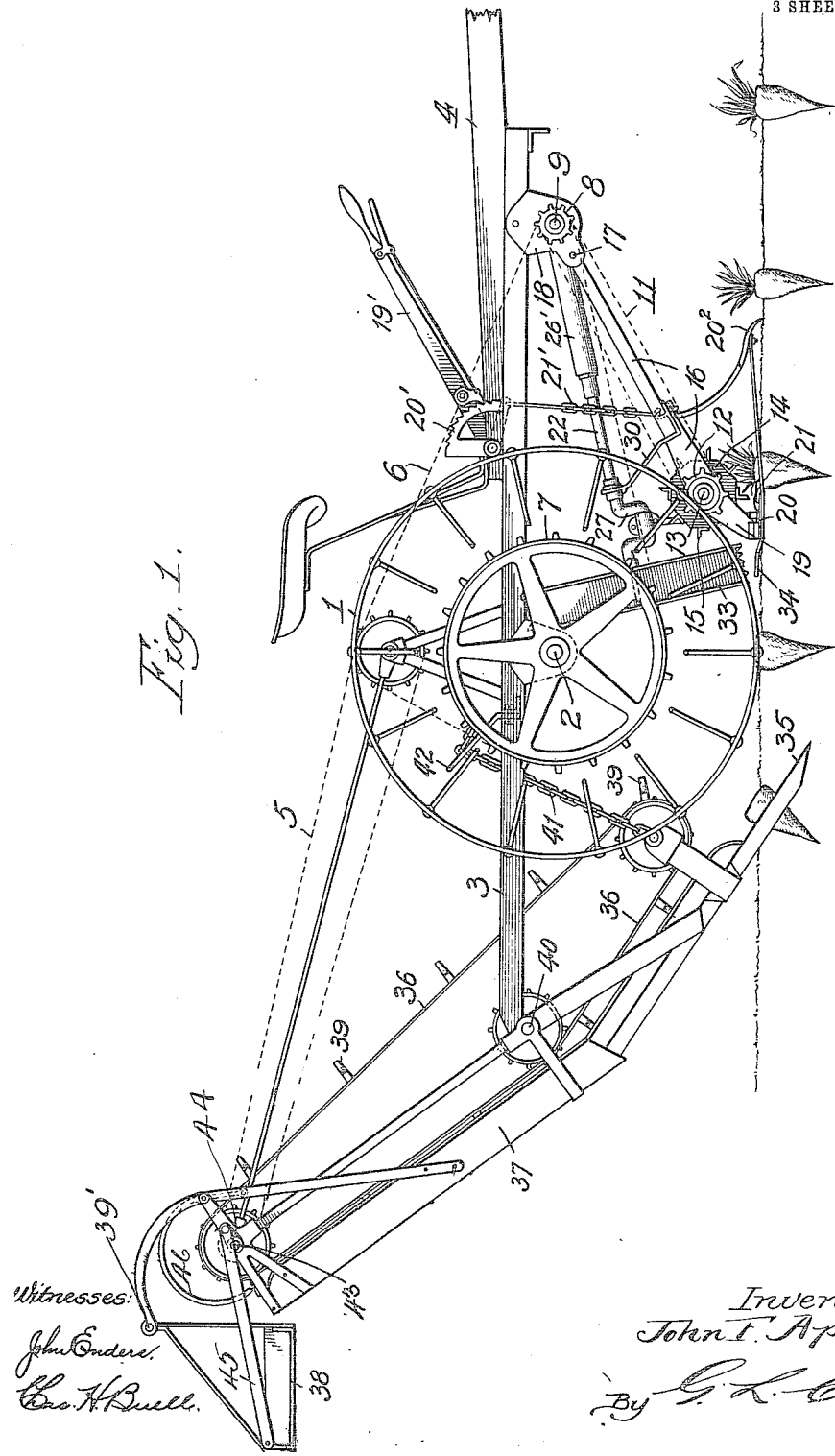

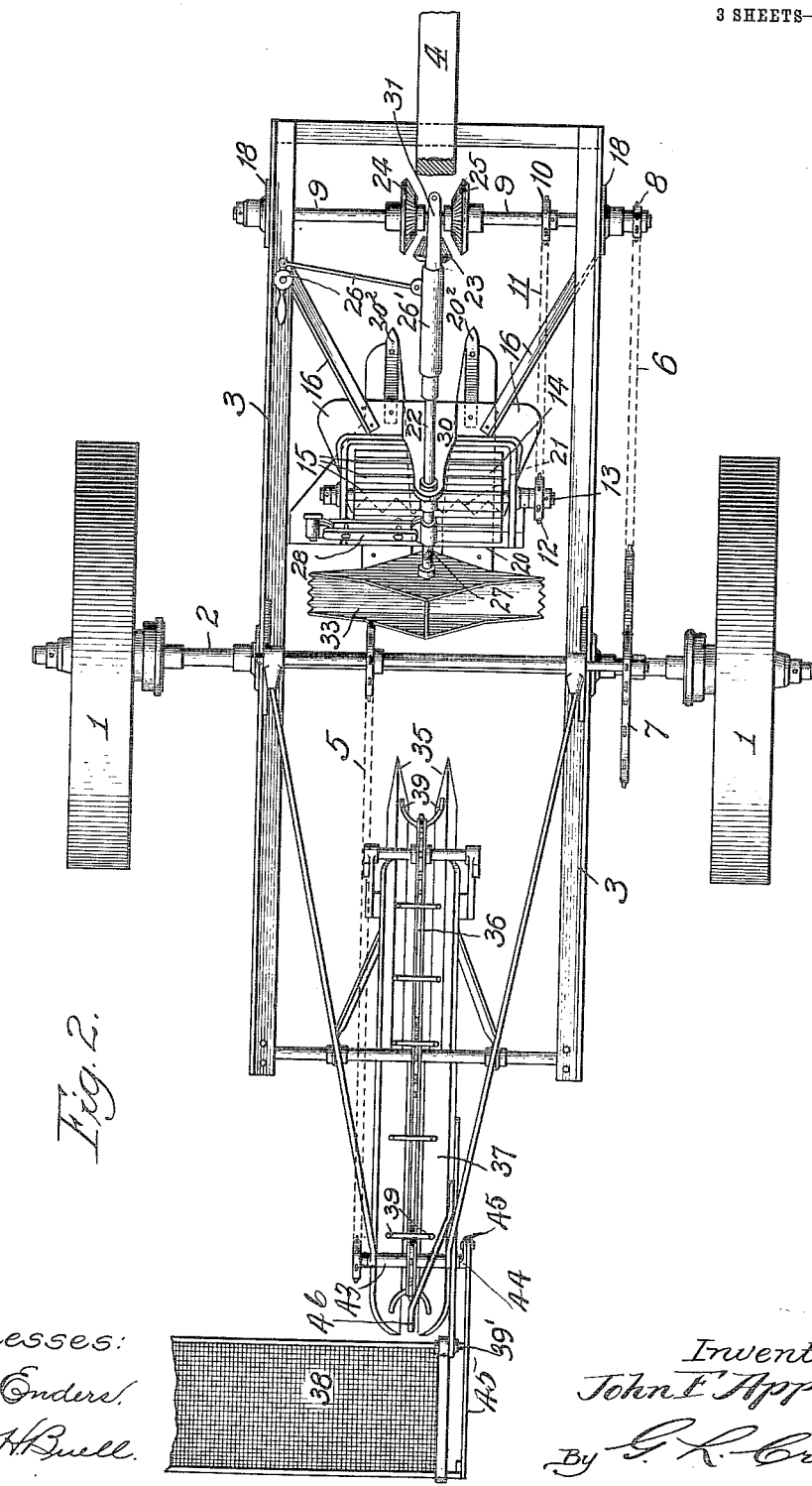

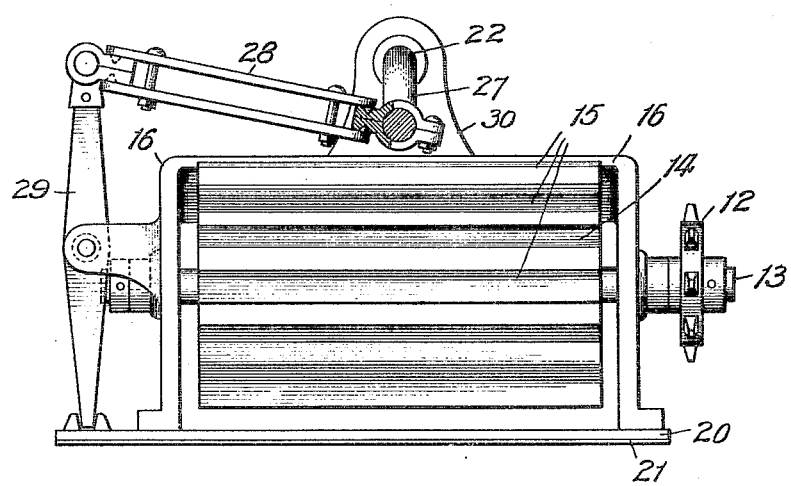
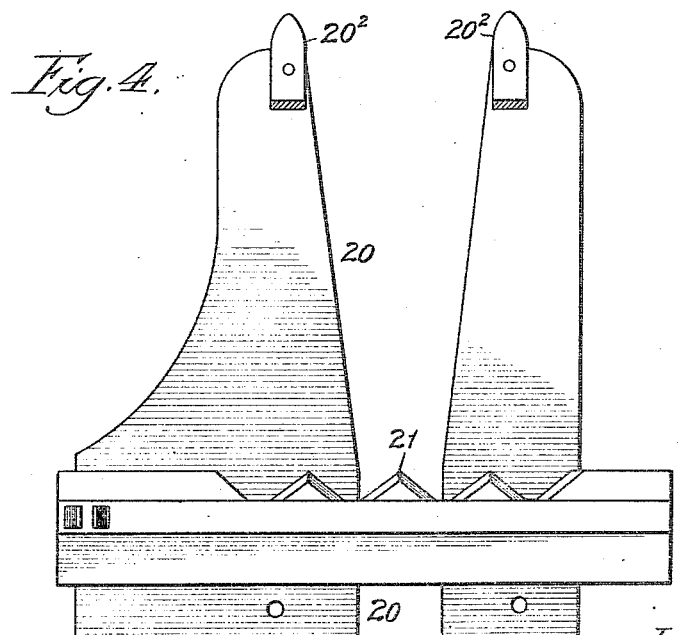

UNITED STATES PATENT OFFICE.

JOHN F. APPLEBY, OF CHICAGO, ILLINOIS.

BEET-HARVESTER.

1,044,472.   Specification of Letters Patent.   Patented Nov. 19, 1912.

Application filed April 20, 1906. Serial No. 312.897

*To all whom it may concern.*

Be it known that I, JOHN F. APPLEBY, citizen of the United States, residing at Chicago, in the county of Cook and State of Illinois, have invented a certain new and useful Improvement in Beet-Harvesters, of which the following is a full, clear, concise, and exact description, reference being had to the accompanying drawings, forming a part of this specification.

My invention relates to beet harvesting machines, and has several objects in view which will be more fully hereinafter set forth in connection with the drawings, showing the preferred embodiment thereof and the invention will be particularly stated in the claims.

In the drawings—Figure 1 is a side elevation of the preferred embodiment of my machine. Fig. 2 is a plan view thereof. Fig. 3 is a view of the gage roller. Fig. 4 is a plan view illustrating the cutter and foliage gathering mechanism.

Like parts are indicated by similar characters of reference throughout the different figures.

While the drawings show a specific embodiment of the invention, it is understood that my claims are not to be limited to this specific embodiment.

In the embodiment shown there is a single pair of traction wheels 1 mounted upon a shaft 2 and fixed thereto, this shaft desirably driving all of the mechanism of the machine. The frame 3 of the machine is rectangular and is provided with a tongue 4, whereby horses may be harnessed thereto. There are two driving sprocket chains 5, 6, or other equivalent means of transmitting power, the chain 5 serving to remove the uprooted beets, while the chain 6 serves to operate the knife or cutting mechanism, which is preferably adapted both to remove foliage from the beets and to crown the same, though I do not wish to be limited to this double function of the cutting mechanism.

The sprocket chain 6 is driven by a sprocket gear wheel 7 attached to the driving shaft 2, this sprocket chain engaging another sprocket wheel 8 mounted upon the counter shaft 9, upon which counter shaft there is disposed a sprocket gear wheel 10 operating a sprocket chain 11 that engages a sprocket wheel 12 operating a shaft 13. The shaft 13 carries a gage roller 14 constituting a part of the cutting mechanism provided with a plurality of knives 15 extending longitudinally of the roller (preferably, but not necessarily, parallel with the axis of the roller). The frame 16 that carries this gage roller is pivoted at 17 to the plates 18. Said frame 16 may be elevated and lowered by means of the quadrant lever 19¹ and the coöperating rack 20¹, a chain 21¹ connecting said frame 16 with said lever. A continuation 19 of the frame carries a plate 20 which supports a cutting tool 21, preferably serrated in formation, the knives 15 advancing toward the serrated portion of the cutting tool 21 so that the beet tops are confined between an engaging knife 15 and the cutting tool 21, whereby that portion of the beet which it is desired to remove, may be cut away. The cutting tool 21 preferably reciprocates in a plane that is substantially coincident with the level of the ground, so that the portions of the beets projecting above the ground may be all substantially removed, this operation being called a "crowning" operation. The free edges of the elements 15 are sharpened to constitute knife edges, so that the said edges may pass through the foliage and firmly grip the beets to afford abutments that serve to hold the beets while the same are crowned or topped. By this construction the knife will not displace the beet. I preferably cause the driving chain 11 to be so geared that it will drive the gage roller at such a speed that an engaging knife blade 15 moves backward with reference to the beet as the vehicle moves forward. By this movement of an engaging blade 15, said blade is caused to approach the cutting tool 21 as said tool is worked into the beet, so that the abutment afforded by the element 15 is not removed as the tool 21 enters the beet. It will be seen that the beet is firmly held in place by an engaging rib element 15 which travels rearwardly with reference to the beet at about the same rate that the cutting tool 21 enters the beet, the ground further acting to hold the beet in place as the same is topped or crowned.

The gage roller is adapted automatically to swing bodily upon the pivot 17, said gage roller riding upon the beet tops and desirably having a lower limit of depression regulated by the chain 21¹ and the lever mechanism associated therewith, or, if desired, said roller may track upon the ground. The said gage roller is therefore a machine trailing gage roller, and I believe it to be important to provide a machine trailing gage roller having rib formations 15 (whether said rib formations are provided with knife edges or not) that travel toward the working cutting tool 21, so that as said cutting tool works its way into the beet, the rib formation is moved toward the same to continue the purchase upon the beet, whereby said cutting tool may perform its function, and, in the preferred embodiment of the invention, the travel of the gage roller is such that not only is the desired purchase afforded, but the beet is actively forced toward the cutting tool 21.

The shaft 22 is provided with a bevel pinion 23 adapted for engagement with one or the other of two bevel pinions 24, 25 according to the direction of movement of said shaft 22 by means of lever mechanism 26 that is articulated to a sleeve $26^1$ through which the shaft 22 passes.

The object of providing an alternative gear connection for the bevel gear 23 will be hereinafter set forth. Assuming that said bevel gear 23 is in engagement with either of the bevel gears 24, 25, the crank portion 27 of the shaft 22 is rotated, whereby, through means of link connections 28, 29, the cutting tool 21 is reciprocated. A strap 30 is supported by the frame 16 and carries at its upper end a journal for the shaft 22, whereby the lower end of said shaft is mounted, the upper end of the shaft being provided with a sleeve 31 surrounding the shaft 9. The shaft 22 therefore is provided with a journal mounting in the frame 16 and moves therewith. The same shaft 22 carries a sweeper 33, which is therefore operated at a speed proportional to the speed of operation of the cutting tool 21, whereby the said sweeper may remove the beet tops as fast as they are discharged from the cutting mechanism. The plate 20 is itself continued or supports a continuation 34 which is disposed partially beneath the sweeper, so that the beet tops will not find lodgment upon the ground, but are lodged upon the support 34, whereby the sweeper may sweep said beet tops from a surface that is always fixed with respect to the axis of rotation of the sweeper. I believe this to be an important feature of my machine, for I believe I am the first to discharge the beet tops upon a shelf or support carried by the vehicle, whereby substantially all of the beet tops are bound to be swept away.

The plate 20 is preferably bifurcated as indicated in Fig. 4 and has two downwardly extending noses $20^2$, which noses, together with the bifurcated portions of the plate 20, act as fenders to gather the foliage, whereby the foliage is bound to fall upon the extension 34. The opposing margins of the bifurcated portions of the plate 20 converge toward the cutting tool so that the gathering of the foliage may be gradual.

Hitherto where the beet tops were disposed directly upon the ground, the sweepers did not always move the same from the path of the diggers 35 and conveying mechanism 36 so that hitherto the beet tops were frequently carried with the crowned beets by the conveyer.

In order that the beet tops may not find lodgment upon adjacent rows of uncrowned beets, I have provided the adjusting lever mechanism 26 and the two gears 24, 25, whereby the direction of rotation of the sweeper 33 could be governed according to the direction in which the beet tops were to be cast, and this I also consider to be a very important feature of construction in beet harvesters.

After the beets have been crowned or topped, the diggers 35 uproot the same and the conveying chain 36 carries the uprooted beets up the chute 37, from which chute the beets are discharged into a channel-way 38 leading to a suitable receptacle. The conveyer chain 36 is desirably provided with forks 39 that straddle the uprooted beets and force their conveyance along the chute. The diggers 35 are pivoted to the frame at 40 about where the chute has its lower termination, and an adjusting device, such as the chain 41 and hook 42, may be employed to determine the position of the points of the diggers in the ground or to elevate said diggers entirely away from the ground, as desired.

In order that the soil may be removed from the beets before the beets are discharged from the machine, I provide upon the upper shaft 43 a crank 44 operating a pitman 45 connected at its lower end to the basket, trough or spout 38 having a screen bottom. As the chain travels, the pitman 45 causes the spout 38 to rock upon its pivot $39^1$, whereby said spout is shaken for the purpose indicated. In order that the beets may not be carried past the spout by the forks, I provide a stripper 46 projecting into the path of the beets and forcing their removal from the forks. The stripper is desirably so placed that it will occupy a position between the members of the forks as the forks pass the point of the stripper.

The mechanism described in the last two paragraphs forms the subject matter of my division of this application, which divisional application was filed July 12, 1906 and bears Serial No. 325,759.

While I have herein shown and particularly described the preferred embodiment of my invention, I do not wish to be limited to the precise details of construction, but,

Having thus described my invention, I claim as new and desire to secure by Letters-Patent:

1. A beet harvester including cutting mechanism, sweeping mechanism supplied in addition to the cutting mechanism and a single shaft in direct driving connection with the cutting and sweeping mechanisms.

2. A beet topper including cutting mechanism, a shelf carried by the topper, upon which the beet tops are discharged by the cutting mechanism, and sweeping mechanism supplied in addition to the cutting mechanism and serving to brush the beet tops from said shelf, said sweeping and cutting mechanisms being united and swingingly mounted.

3. A beet harvester including cutting mechanism, sweeping mechanism, supplied in addition to the cutting mechanism, and a single shaft in direct driving connection with the cutting and sweeping mechanisms, said sweeping and cutting mechanisms being united and swingingly mounted.

4. A beet harvester including cutting mechanism, rotatable sweeping mechanism, supplied in addition to the cutting mechanism, for sweeping beet tops to one side, and means for changing the direction of rotation of the sweeping mechanism, said sweeping and cutting mechanisms being united and swingingly mounted.

In witness whereof, I hereunto subscribe my name this 10th day of April A. D., 1906.

JOHN F. APPLEBY.

Witnesses:
G. L. CRAGG,
LEON STROH.